(12) United States Patent
Zou

(10) Patent No.: US 6,599,606 B1
(45) Date of Patent: Jul. 29, 2003

(54) PROCESS FOR PREPARATION OF CRYSTALLIZED GLASS FOR INFORMATION RECORDING DISK

(75) Inventor: Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 250 days.

(21) Appl. No.: 09/612,629

(22) Filed: Jul. 7, 2000

(30) Foreign Application Priority Data

Jul. 7, 1999 (JP) .......................................... 11/193570
Oct. 21, 1999 (JP) .......................................... 11/299827

(51) Int. Cl.$^7$ .............................................. G11B 5/82
(52) U.S. Cl. .................... 428/64.2; 428/65.3; 428/426; 428/694 ST; 428/694 SG; 428/900; 428/141; 501/5; 501/7; 501/63
(58) Field of Search ............................. 428/64.2, 65.3, 428/426, 694 ST, 694 SG, 900, 141; 501/5, 7, 63

(56) References Cited

U.S. PATENT DOCUMENTS

| | | | | |
|---|---|---|---|---|
| 5,476,821 A | * | 12/1995 | Beall et al. ..................... | 501/10 |
| 5,491,116 A | * | 2/1996 | Beall et al. ..................... | 501/5 |
| 5,874,376 A | | 2/1999 | Taguchi et al. | |
| 5,910,459 A | * | 6/1999 | Beall et al. ..................... | 501/8 |
| 6,124,223 A | * | 9/2000 | Beall et al. ..................... | 501/4 |
| 6,294,490 B1 | * | 9/2001 | Zou et al. ....................... | 501/9 |

FOREIGN PATENT DOCUMENTS

| | | |
|---|---|---|
| DD | 127 795 | 10/1977 |
| EP | 1 057 794 | 12/2000 |
| JP | 10-287444 | * 10/1998 |
| JP | 11-278865 | 10/1999 |

* cited by examiner

*Primary Examiner*—Stevan A. Resan
(74) *Attorney, Agent, or Firm*—Burns, Doane, Swecker & Mathis, L.L.P.

(57) ABSTRACT

Disclosed is a process for preparation of crystallized glass obtained by making a glass containing $TiO_2$ subjected to a phase separation step and a crystallization step, where the phase separation step has heat treatment of the glass at a temperature in a range from a temperature of the glass transition temperature Tg (Tg–30° C.) to a temperature 60° C. higher than the glass transition temperature Tg (Tg+60° C.). There are also disclosed a crystallized glass for information recording disk composed of the crystallized glass obtained by the preparation process, where a mean particle size of the crystal particles is in a range of equal to or less than 100 nm, or where a transparency at a wavelength of 600 nm is 40% or higher; and an information recording disk, composed of the glass, having a polished surface with a surface roughness Ra (JIS B0601) in a range from 0.1 to 0.5 nm.

31 Claims, 6 Drawing Sheets

Dependency of Surface roughness of crystallized glass (Example 1) on Pretreatment temperature Untreated glass      Glass treated at 760°C for 4 hrs.

TEM photographs on untreated glass and
glass (Example 1) treated at 760°C for 4 hrs.

Unpretreated glass　　　　　Glass pretreated at 760°C for 4 hrs.

TEM photographs on untreated glass and
glass (Example 1) heat treated at 1000°C for 4 hrs.

PROCESS FOR PREPARATION OF CRYSTALLIZED GLASS FOR INFORMATION RECORDING DISK

This application claims priority under 35 U.S.C. §§119 and/or 365 to Japanese Patent Application No. 193570/1999 filed in Japan on Jul. 7, 1999 and Japanese Patent Application No. 299827/1999 filed in Japan on Oct. 21, 1999; the entire content of which is hereby incorporated by reference.

BACKGROUND OF THE INVENTION

1. Field of the Invention

The present invention relates to a process for preparation of crystallized glass having high stiffness suitable for information recording disks such as magnetic disk substrates or the like and obtaining high surface smoothness and high surface flatness. The present invention further relates to crystallized glass, obtained by the process for preparation according to the present invention, having excellent surface smoothness and surface flatness, to a substrate for information recording medium composed of the crystallized glass, and to a magnetic disk using the substrate.

2. Description of the Related Art

Major structural components of magnetic storage apparatuses such as computers and the like are a magnetic recording medium and a magnetic head for magnetic recording and reproducing. Flexible disks and hard disks have been known as magnetic recording media. As a material of a substrate for the hard disk, aluminum alloy is mainly utilized. In addition, recently, a flying amount of magnetic heads is markedly reduced along with higher densification of recording of personal computers or hard disk drives for servers (lower flying of the magnetic heads). Accordingly, extremely high precision has been demanded for the surface smoothness of the magnetic disk substrates. In the case of aluminum alloy, however, it is difficult to produce a highly flat surface more than a certain level, even with a polishing process using highly precise abrasives and working apparatuses, because the polished surface suffers from plastic deformation due to the low hardness of the aluminum alloy. As TPI (Track per Inch) and BPI (Bit Per Inch) of the magnetic disk recording are made higher, or revolution speed of the disk is made higher, it has also been required to greatly reduce deflexion or vibration of the substrate for magnetic disks at the time of revolution at a high speed, thus to lower a number (TMR) of reading errors of data due to the vibration or flexion. Since aluminum alloy has low strength and low stiffness, however, it is difficult to keep the TMR of a predetermined low level required by specification of hard disk drive.

Therefore, crystallized glass substrates for magnetic disks having high stiffness have been developed instead of the aforementioned aluminum substrates. For example, U.S. Pat. No. 5,476,821 discloses crystallized glass for disks comprising oxide components, indicated in terms of % by weight, of $SiO_2$: 35–60%, $Al_2O_3$: 20–35%, MgO: 0–25%, ZnO: 0–25%, provided that MgO+ZnO is more than 10% (MgO+ZnO>10%), $TiO_2$: 0–20%, $ZrO_2$: 0–10%, $Li_2O$: 0–2%, and NiO: 0–8%, provided that $TiO_2+ZrO_2+NiO$ is more than 5% ($TiO_2+ZrO_2+NiO>5\%$) the crystallized glass containing spinel crystal particles as a main crystal. In addition, U.S. Pat. No. 5,491,116 discloses crystallized glass for disks comprising oxide components, indicated in terms of % by weight, of $SiO_2$: 35–60%, $Al_2O_3$: 10–30%, MgO: 12–30%, ZnO: 0–10%, $TiO_2$: 5–20%, NiO: 0–8% and the like, the crystallized glass containing spinel crystal particles or enstatite crystal particles as main crystals.

Although these crystallized glasses have a higher Young's modulus of approximately 140 GPa, crystal particles thus contained are larger, so there occurs such a defect that controlling a surface roughness to be 0.5 nm or lower in Ra (JIS B0601) is difficult. Even if the Young's modulus is higher, such as approximately 140 GPa, it is impossible to control the head-flying amount, thereby being incapable of responding to higher recording densification.

SUMMARY OF THE INVENTION

It is an object of the present invention to provide crystallized glass maintaining a characteristic of high stiffness (>130 GPa) suitable as substrates for information recording media such as magnetic recording media or the like, the crystallized glass having excellent properties such as a high surface smoothness, a high flatness and the like, that is, the crystallized glass capable of controlling the surface roughness to be 0.5 nm or lower in Ra (JIS B0601).

In order to achieve the above objects, the present inventors found, as a result of studies based on various experiments, that crystallized glass which is suitable as substrates for information recording media having a high Young's modulus of 140 GPa or higher and a surface roughness of 0.5 nm or lower in Ra (JIS B0601) can be obtained by subjecting glass containing $TiO_2$ as a crystal nucleating agent to heat treatment at a temperature in a range from a temperature 30° C. lower than the glass transition temperature, or Tg, to a temperature 60° C. higher than the glass transition temperature, or Tg, thus to be homogeneously phase-separated and then by crystallizing the resulting glass, and consequently, the present invention has been completed.

Furthermore, the present inventors found that it is preferable, for providing the crystallized glass suitable as substrates for information recording media having the higher Young's modulus of 140 GPa or higher as well as the surface roughness of 0.5 nm or lower in Ra (JIS B0601), to heat up the aforementioned phase-separated glass to a temperature for crystallization (for example, 850° C. to 1150° C.; more preferably, 900° C. to 1100° C.) at a heating rate of 10° C./min or less.

In other words, the present invention relates to a process for preparation of crystallized glass obtained by making a glass containing $TiO_2$ subjected to a phase separation step and a crystallization step, where the phase separation step has heat treatment of the glass at a temperature in a range from a temperature 30° C. lower than the glass transition temperature Tg of the glass (Tg−30° C.) to a temperature 60° C. higher than the glass transition temperature Tg (Tg+60° C.), more preferably from the glass transition temperature Tg to a temperature 60° C. higher than the glass transition temperature.

Furthermore, the present invention relates to crystallized glass obtainable by making a starting glass containing $TiO_2$ subjected to a phase separation step and a crystallization step, where the phase separation step has heat treatment of the glass at a temperature in a range from a temperature 30° C. lower than the glass transition temperature of the glass to a temperature 60° C. higher than the glass transition temperature.

According to the present invention, a plate-shaped crystallized glass, especially, a disk-shaped crystallized glass plate can be obtained.

The present invention further comprises: a substrate for information recording medium, composed of a disk-shaped crystallized glass plate, characterized in that a mean particle size of the crystal particles is in the range of equal to or less than 100 nm; a substrate for information recording medium, composed of a disk-shaped crystallized glass plate, characterized in that a transparency at a wavelength of 600 nm is 40% or higher; and a substrate for information recording medium, composed of a disk-shaped crystallized glass plate, characterized in that a polished surface having a surface roughness Ra (JIS B0601) of 1 nm or lower are provided.

In addition, the present invention relates to a process for preparation of a magnetic disk having a magnetic layer at least as a recording layer formed on a disk-shaped crystallized glass plate, and to a magnetic disk having a magnetic layer at least as a recording layer on the substrate for information recording medium.

BRIEF DESCRIPTION OF THE DRAWINGS

The above and other objects and features of the invention are apparent to those skilled in the art from the following referred embodiments thereof when considered in conjunction with the accompanied drawings, in which.

DESCRIPTION OF THE PREFERRED EMBODIMENTS

Figure 1:
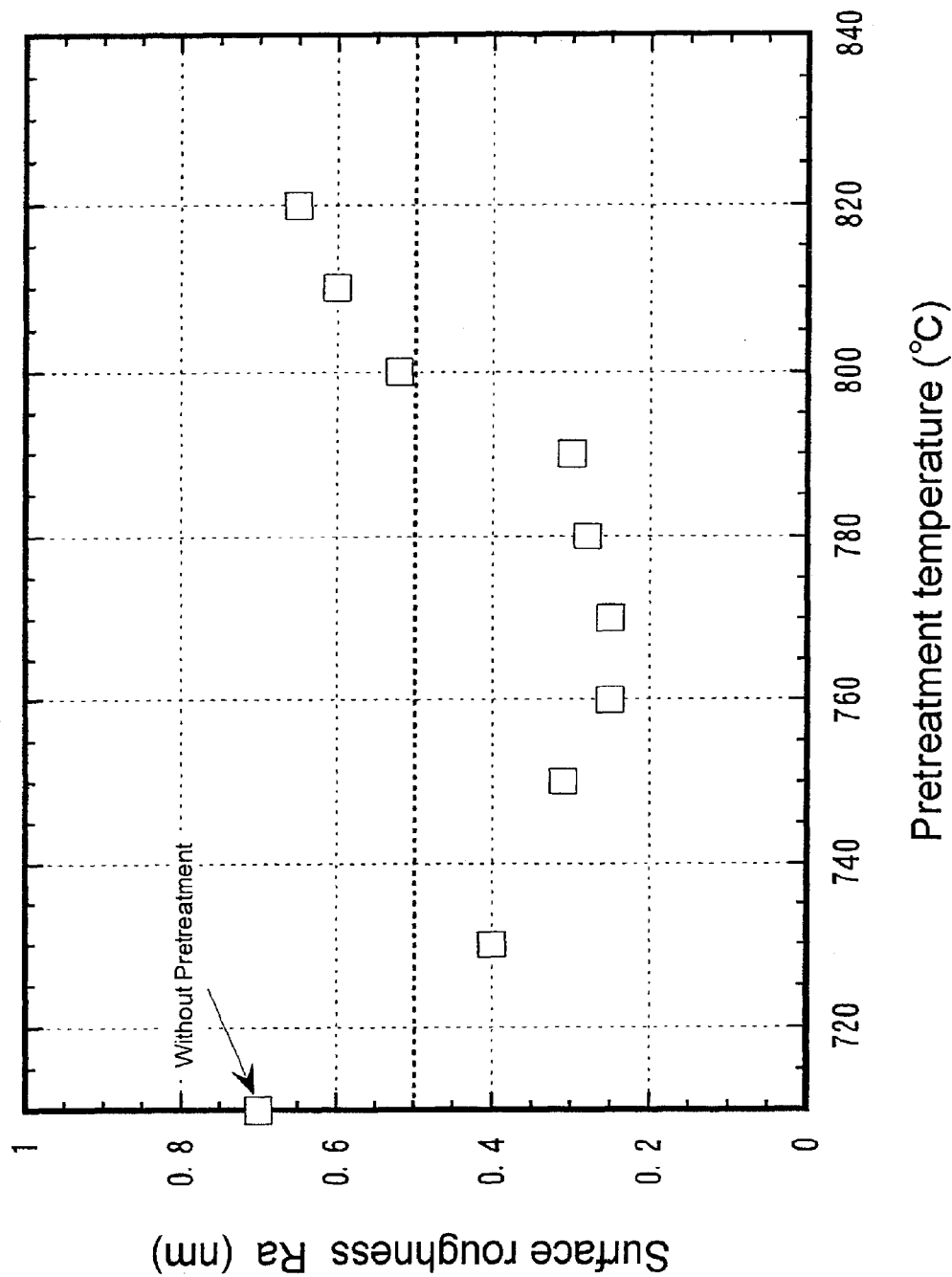
FIG. 1 shows a relation between a surface roughness of crystallized glass and a treatment temperature for phase separation.

The present invention relates to a process of crystallized glass by subjecting glass containing $TiO_2$ to a phase separation step and a crystallization step, and to a crystallized glass obtainable by the process. $TiO_2$ contained in a starting glass is a component serving as a crystal nucleating agent in a process of the preparation of the crystallized glass. A content of $TiO_2$ is adequately 8 mol % or higher from the viewpoint of that the glass can be sufficiently phase-separated in the heat treatment (phase separation step) at a temperature or lower of a temperature 60° C. higher than the Tg of the glass (a temperature or lower of the temperature of Tg+60° C.) which is a characteristic of the present invention, and that the crystal particles of the crystallized glass obtained in the crystallization step can have desired relatively small sizes. In order to deposit further smaller crystal particles from the glass, the content of $TiO_2$ is preferably 8.5 mol % or higher. An upper limit of the content of $TiO_2$ is 15 mol %, and the content should be 12 mol % or less from the viewpoint of that the stable melted glass which is moldable can obtain in the preparation process.

In the process according to the present invention, crystals to be deposited include enstatite and its solid solution, β-quartz and its solid solution, cordierite, titanate, spinel, lithium disilicate, gahnite and the like. Among those, enstatite and its solid solution are preferable as crystals to be contained in a crystallized glass used for the substrate for in information recording medium, because the enstatite and its solid solution can provide higher Young's modulus even if the crystal particles are small.

The starting glass containing $TiO_2$ may be, for example, $MgO—Al_2O_3—SiO_2$ based glass or $MgO—RO—Al_2O_3—SiO_2$ (R is at least one selected from a group consisting of alkaline-earth metal (e.g., at least one selected from a group consisting of Ca, Sr and Ba), Zn and Ni) based glass, the glasses containing $TiO_2$ and having a total content of MgO, $Al_2O_3$ and $SiO_2$ of 80 mol % or higher. Such $MgO—Al_2O_3—SiO_2$ based glass and $MgO—(RO)—Al_2O_3—SiO_2$ based glass as containing $TiO_2$ as a crystal nucleating agent are extremely easy to be phase-separated at around the Tg. Therefore, these glasses are suitable for preparation of the crystallized glass having a micro-crystal structure utilizing micro-phase separations at a lower temperature as in the present invention. As starting glasses containing $TiO_2$, there can be exemplified glasses described in the aforementioned U.S. Pat. No. 5,476,821 and the U.S. Pat. No. 5,491,116, or the glass containing $SiO_2$: 35 to 65 mol %, $Al_2O_3$: 5 to 25 mol %, MgO: 10 to 40 mol % where $SiO_2+Al_2O_3+MgO \leq 80$ mol %, $TiO_2$: 5 to 15 mol %, and RO (R is at least one selected from a group consisting of alkaline-earth metal (Ca, Sr, or Ba), Zn and Ni): 0 to 10 mol %.

The starting glass containing $TiO_2$ may contain components, in an extent not damaging the desired characteristics of the crystallized glass, such as alkali metal oxides (for example, $Li_2O$, $Na_2O$, $K_2O$ or the like) and/or alkaline-earth metal oxides (for example, CaO, SrO, BaO, or the like). In the case that the starting glass containing $TiO_2$ is the aforementioned $MgO—Al_2O_3—SiO_2$ based glass which contains $TiO_2$, an alkali metal oxide and/or an alkali-earth metal oxide can be additionally contained. In the case that the starting glass containing $TiO_2$ is the aforementioned $MgO—RO—Al_2O_3—SiO_2$ based glass which contains $TiO_2$, analkali metal oxide can be additionally contained. As a matter of course, two or more kinds of the respective alkali metal oxides and alkaline-earth metal oxides can be used concurrently.

For example, the preparation process of the present invention can be applied to the preparation of a crystallized glass as follows.

The crystallized glass comprises $SiO_2$: 35–65 mol %

$Al_2O_3$: 5–25 mol %

MgO: 10–40 mol %

$TiO_2$: 5–15 mol %

$Y_2O_3$: 0–10 mol %

$ZrO_2$: 0–6 mol %

$R_2O$: 0–5 mol % (provided that R is at least one selected from the group consisting of Li, Na, and K)

RO: 0–5 mol % (provided that R is at least one selected from the group consisting of Ca, Sr, and Ba)

$As_2O_3+Sb_2O_3$: 0–2 mol %, and $SiO_2+Al_2O_3+MgO+TiO_2$: 92 mol % or more, and the principal crystal phase is enstatite and/or its solid solution.

The crystallized glass comprises
SiO$_2$: 44–52% by weight
MgO: 16–25% by weight
Al$_2$O$_3$: 13–20% by weight
TiO$_2$: 10–15% by weight
ZrO: 1–8% by weight
ZrO$_2$: 0–5% by weight
Li$_2$O: 0–3% by weight
B$_2$O$_3$: 0–3% by weight
P$_2$O$_5$: 0–5% by weight, and
Sb$_2$O$_3$: 0–2% by weight
and main crystals are enstatite.

The crystallized glass comprises
SiO$_2$: 40–60% by weight
MgO: 10–20% by weight
Al$_2$O$_3$: less than 10–20% by weight
P$_2$O$_5$: 0–4% by weight
B$_2$O$_3$: 0–4% by weight
CaO: 0.5–4% by weight
BaO: 0–5% by weight
ZrO$_2$: 0–5% by weight
TiO$_2$: 2.5–8% by weight
Sb$_2$O$_3$: 0–1% by weight
As$_2$O$_3$: 0–1% by weight
F: 0–3% by weight
SnO$_2$: 0–5% by weight
MoO$_3$: 0–3% by weight
CeO: 0–5% by weight, and
Fe$_2$O$_3$: 0–5% by weight
and main crystals are at least one selected from cordierite solid solution, spinel crystal, solid solution of the spinel crystal, enstatite, enstatite solid solution, β-quartz, and β-quartz solid solution.

The crystallized glass comprises
SiO$_2$: 40–60% by weight
MgO: 10–20% by weight
Al$_2$O$_3$: less than 10–20% by weight
P$_2$O$_5$: 0.5–2.5% by weight
B$_2$O$_3$: 1–4% by weight
Li$_2$O: 0.5–4% by weight
CaO: 0.5–4% by weight
ZrO$_2$: 0.5–5% by weight
TiO$_2$: 2.5–8% by weight
Sb$_2$O$_3$: 0.01–0.5% by weight
As$_2$O$_3$: 0–0.5% by weight
SnO$_2$: 0–5% by weight
MoO$_3$: 0–3% by weight
CeO: 0–5% by weight, and
Fe$_2$O$_3$: 0–8% by weight
and main crystals are at least one kind selected from β-quartz, β-quartz solid solution, enstatite, enstatite solid solution, forsterite, and forsterite solid solution.

With the alkali metal oxide and/or alkaline-earth metal oxide, nitrate can be used as a starting glass. When Sb$_2$O$_3$ is used as a degassing agent during the glass preparation, platinum from a platinum crucible for melting glasses is easily mixed with the glass, so using nitrate as a starting glass can inhibit the platinum from being mixed with the glass. It is preferable that the content of the alkali metal oxide and the alkaline-earth metal oxide is respectively 0.1 mol % or higher, from the viewpoint of obtaining the above advantage. It is to be noted that, in the case of containing alkali metal oxide, the content of the alkali metal oxide is adequately 5 mol % or less since the alkali metal oxide tends to lower the Young's modulus. In the case of containing alkaline-earth metal oxide, on the other hand, the content of the alkaline-earth metal oxide is adequately 5 mol % or less since the alkaline-earth metal oxide tends to make the crystal particles larger. In the case of containing the alkali metal oxide, especially, K$_2$O of 0.1 to 5 mol %, preferably 0.1 to 2 mol %, further preferably 0.1 to 1 mol % is desirable. In the case of containing the alkaline-earth metal oxide, especially, SrO of 0.1 to 5 mol %, preferably 0.1 to 2 mol % is desirable.

The crystallized glass prepared using the aforementioned glass in the process according to the present invention contains enstatite or its solid solution and/or quartz solid solution as a principal crystal phase.

A process of respective heat treatments in the process for preparation of the crystallized glass according to the present invention will hereinafter be described.

When subjected to the heat treatment at a temperature 30° C. lower than the Tg, or higher, MgO—(RO)—Aa$l_2$O$_3$—SiO$_2$ (R=alkaline-earth metal (e.g., Ca, Sr, Ba, Zn and Ni)) based glass containing a certain amount of TiO$_2$ is separated into two phases, a phase abounding with TiO$_2$ and a phase abounding with SiO$_2$. That is, the glass shows, what we called, phase separation (phase separation step). Such phase separation of the glass has a great influence on kinds and particle sizes of the crystals in the crystallized glass. Normally, the phases abounding with TiO$_2$ are dispersed, in forms of microparticles, among the glass matrix phases abounding with SiO$_2$. As the microparticles abounding with TiO$_2$ are smaller, a size of the final crystal particle formed from the micro-phase separated particle as a core is made smaller. How to deposit the smaller micro-phase separated particle is the key point in producing crystallized glass containing fine crystal particles.

Next, relation between the crystal structure of the crystallized glass and the treatment temperature in the phase separation step will hereinafter be described referring to 48SiO$_2$—11Al$_2$O$_3$—30MgO—1Y$_2$O$_3$—10TiO$_2$ glass as an example.

The 48SiO$_2$—11Al$_2$O$_3$—30MgO—1Y$_2$O$_3$—10TiO$_2$ glass (the glass having composition 1 in Table 2 according to the after-mentioned Examples) was subjected to heat treatment for four hours in a range of temperature (730–820° C.) which is around Tg of the glass (Tg=732° C.) to perform phase separation. Immediately after the heat treatment, the glass was heated up to 1000° C. at a heating rate of 5° C./min, and then subjected to crystallization treatment for four hours at the temperature. The glass after subjected to the crystallized treatment was then cut and processed into a disk having a diameter of 95 mm, and thereafter abrasively polished with the use of CeO$_2$ or SiO$_2$.

FIG. 1 shows relation between a surface roughness of the crystallized glass thus obtained and a treatment temperature for phase separation. With respect to the surface roughness measurement, surface was observed using an atomic force microscope (AFM). The arithmetical average roughness in a field of view of 5×5 μm was calculated with respect to 3 to 5 portions on the surface of respective samples. As shown in FIG. 1, it was found that the surface roughness of the crystallized glass which was subjected to the heat treatment for phase separation in the temperature range from the temperature of the Tg (732° C.) to a temperature 60° C.

higher than the Tg was 0.5 nm or less. This is because the size of the crystal particles in the glass which was subjected to the phase separation in the temperature range from a temperature 30° C. lower than the Tg to a temperature 60° C. higher than the Tg was made smaller. From the viewpoint of being able to obtain such crystallized glass having a smaller surface roughness, the heat treatment for phase separation is made in a temperature range from a temperature 30° C. lower than the Tg to a temperature 60° C. higher than the Tg, preferably from the Tg to a temperature 60° C. higher than the Tg, more preferably from a temperature 10° C. higher than Tg to a temperature 50° C. higher than Tg, further preferably from a temperature 20° C. higher than Tg to a temperature 40° C. higher than the Tg.

Figure 2:
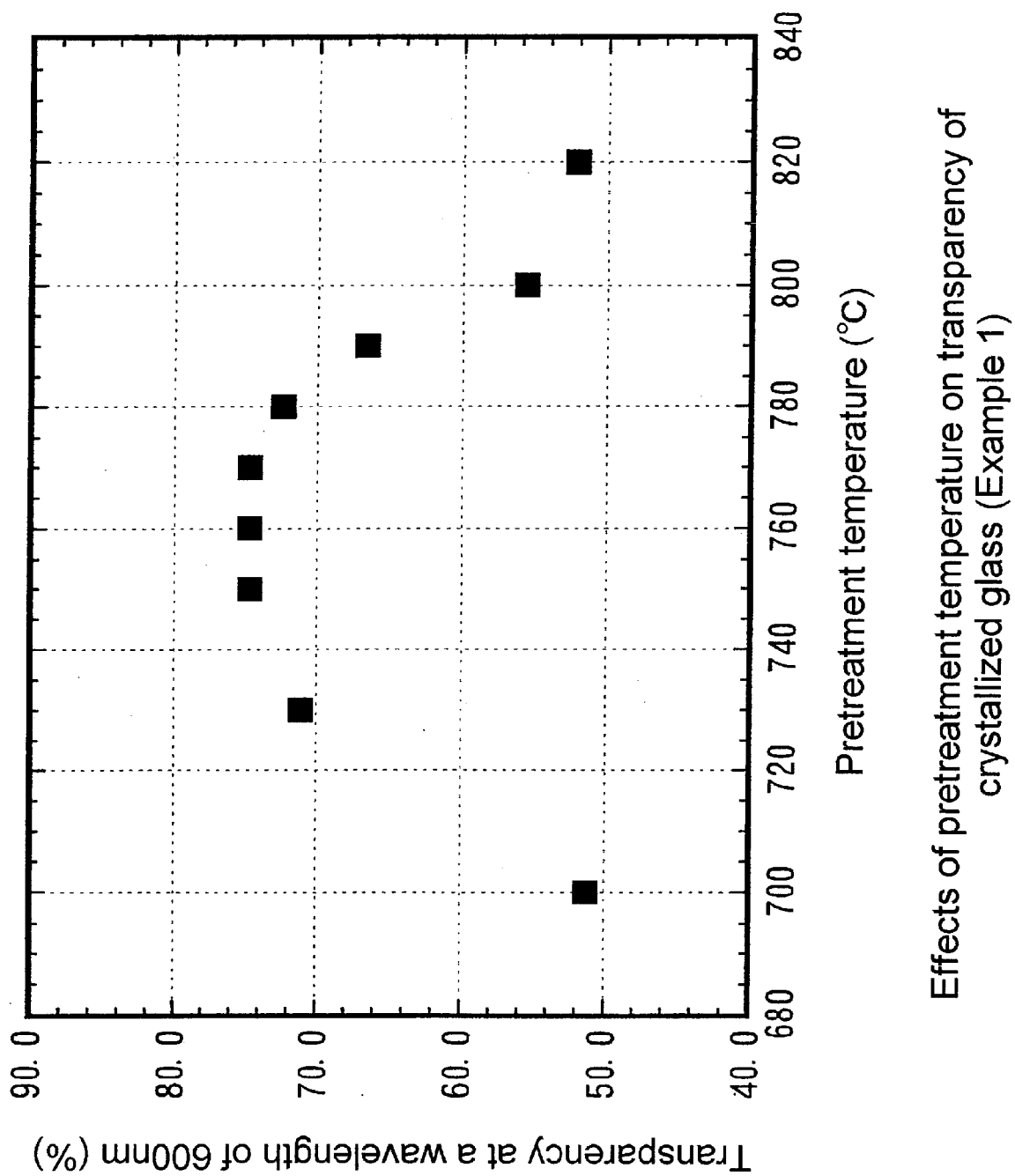
FIG. 2 shows a relation between a transparency at a wavelength of 600 nm of the crystallized glass and a phase separation treatment temperature.

In order to make sure this point, relation between the transparency at a wavelength of 600 nm of the crystallized glass thus obtained and the temperature for the phase separation treatment was sought, and the results are shown in FIG. 2. The results shown in FIG. 2 confirm that the crystallized glass subjected to the phase separation in the temperature range from a temperature 30° C. lower than the Tg to a temperature 60° C. higher than the Tg has a higher transparency, and the crystallized glass obtained through the phase separation treatment in the temperature range above has smaller crystal particles.

Figure 3:
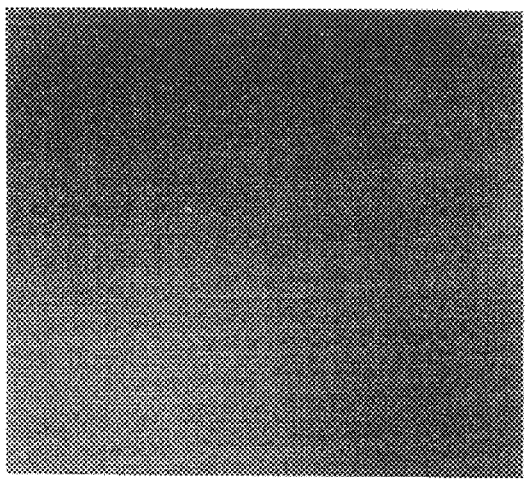
FIG. 3 shows photographs by a transmission electron microscope (TEM) of an untreated glass and a crystallized glass obtained through a phase separation treatment at a temperature of Tg plus 25° C. (760° C.).
Figure 3:
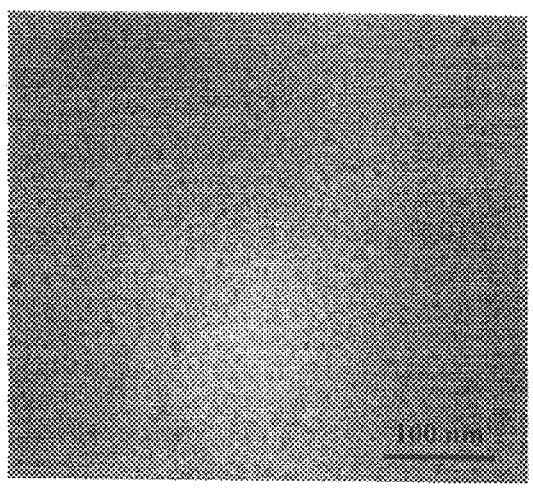

Further, in order to examine how the microstructure of the obtained crystallized glass changes when treated at a temperature around the Tg, the structural changes of an untreated glass and a crystallized glass obtained through a phase separation treatment at a temperature of Tg plus 25° C. (760° C.) were observed using a transmission electron microscope (TEM) FIG. 3 shows TEM photographs of these glasses. As seen from FIG. 3, micro-phase separated particles are not seen in the untreated glass; on the other hand, the micro-phase separated particles abounding with $TiO_2$ are clearly seen in the glass subjected to the heat treatment at a temperature of Tg plus 25° C. (760° C.)

Figure 4:
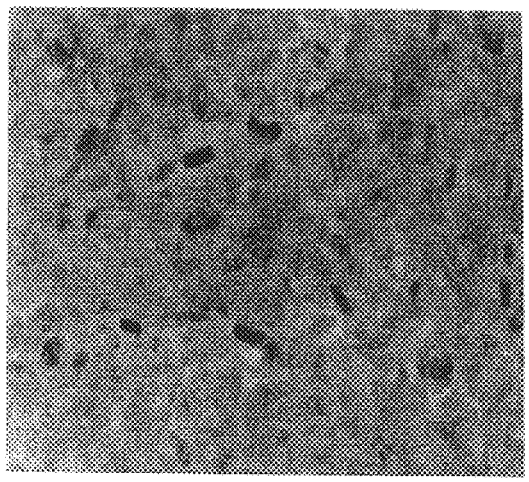
FIG. 4 shows photographs by a transmission electron microscope (TEM) of a glass without being subjected to phase separation treatment and a glass obtained by being subjected to the phase separation for four hours at a temperature of Tg plus 25° C. (760° C.) and thereafter by being subjected to heat treatment for four hours at a temperature of 1000° C.
Figure 4:
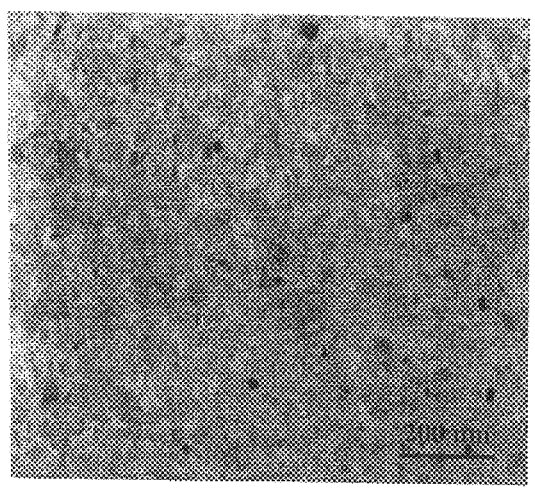

These glasses were further heated up to 1000° C. at a heating rate of 5° C./min and subjected to the crystallization treatment for four hours, and then TEM observations were conducted. FIG. 4 shows TEM photographs of the glass without being subjected to the phase separation treatment and the glass obtained by being subjected to the phase separation treatment for four hours at a temperature of Tg plus 25° C. (760° C.) and thereafter by being subjected to heat treatment for four hours at a temperature of 1000° C. TEM photographs in FIG. 4 shows that the crystal particles of the crystallized glass subjected to the pretreatment for four hours at a temperature of the Tg plus 25° C. (760° C.) are smaller than those of the crystallized glass without being subjected to the phase separation treatment.

The same effect of making the crystal particles in a form of micro-particle given by such the heat treatment for phase separation was observed with respect to glasses having compositions 2 to 10 shown in the after-mentioned Table 2. It was found from the experiments that, when these glasses were subjected to a conventional heat treatment process, that is, subjected to the heat treatment at a temperature of 800° C. ( Tg plus 65° C.), and thereafter subjected to the crystallization treatment under the same conditions, the size of the crystal particles of these glasses became approximately two times as larger as that of the crystallized glass subjected to the phase separation treatment under the conditions according to the present invention.

Further, an influence of such a phase separation treatment on other characteristics of the crystallized glass was also examined. The result is shown in Table 1. As seen from Table 1 below, it is found that the Young's modulus and the expansion coefficient of the crystallized glass prepared in the process of the present invention are almost equal to those of the crystallized glass subjected to the pretreatment with the conventional heat treatment process, or to those of the crystallized glass without being subjected to the pretreatment. That is, the process according to the present invention can make the size of the crystal particle smaller, without changing mechanical characteristics or thermal characteristics of the crystallized glass.

TABLE 1

Pretreatment temperature dependency of Young's modulus and thermal expansion coefficient of Example 1

| | Heating rate (° C./h) | | | | | | | | | |
|---|---|---|---|---|---|---|---|---|---|---|
| | 300 | 300 | 300 | 300 | 300 | 300 | 300 | 300 | 300 | 300 |
| Pretreatment temperature (° C.) | Untreated | 730 | 740 | 750 | 760 | 770 | 780 | 790 | 800 | 820 |
| Pretreatment time (h) | 4 | 4 | 4 | 4 | 4 | 4 | 4 | 4 | 4 | 4 |
| Heating rate (° C./h) | 300 | 300 | 300 | 300 | 300 | 300 | 300 | 300 | 300 | 300 |
| Second treatment temperature (° C.) | 1000 | 1000 | 1000 | 1000 | 1000 | 1000 | 1000 | 1000 | 1000 | 1000 |
| Second treatment time (h) | 4 | 4 | 4 | 4 | 4 | 4 | 4 | 4 | 4 | 4 |
| Young's modulus (GPa) | 148.8 | 147.2 | 147.1 | 147 | 147 | 147.5 | 147.9 | 148.5 | 148.8 | 148.8 |
| Thermal expansion coefficient ($10^{-7}$ /° C.) | 73.8 | 73 | 72.8 | 73.2 | 72.15 | 72.8 | 72.33 | 73.9 | 72.4 | 73.1 |

Pretreatment: Heat treatment for production of crystal nucleus
Second treatment: Heat treatment for growth of crystal particles In the preparation process according to the present invention, it is preferable to heat up the glass obtained through the phase separation step up to a temperature in the crystallization step at a heating rate of 10° C./min or less. The reason for controlling the heating rate, at which a temperature is elevated from a treatment temperature in the phase separation step to a treatment temperature in the treatment temperature for crystallization, to be 10° C./min or less is to avoid the deformation of the glass. Ordinary crystallized glass is subjected to the heat treatment for phase separation at a temperature higher than the temperature used in the present invention, so the glass is already partially crystallized during the treatment. Therefore, even if the heating rate is faster, deformation hardly occurs. On the other hand, the glass subjected to the heat treatment for phase separation in the process according to the present invention substantially does not contain crystal particles, and consequently, the glass might be deformed when the heating rate is faster. When the glass is heated up at a slower rate of 10° C./min or less, crystal particles are gradually deposited while being heated up, thus to suppress the deformation of the glass. The heating rate as mentioned above is preferably in the range from 1° C./min to 7° C./min. Slower heating rate is highly advantageous to homogenous formation of the crystal particles.

Heating for crystallization is suitably determined in consideration of the characteristics such as a size of the glass crystal particle, crystallinity, Young's modulus and the like; for example, heating can be performed for about 1 to 10 hours at a temperature ranging from 850° C. to 1100° C.

With the process according to the present invention, crystallized glass, in which a mean particle size of the crystal particle is in the range of equal to or less than 100 nm, can be obtained.

In the crystallized glass obtained through the process according to the present invention, a mean particle size of the crystal particle is in the range of equal to or less than 100 nm, but preferably, the mean particle size of the crystal particle is in the range of from 10 to 70 nm. The mean particle size of the crystal particle can be measured with the use of, for example, a transmission electron microscope (TEM).

In addition, in the crystallized glass obtained through the process according to the present invention, a transparency at a wavelength of 600 nm can be 40% or higher, preferably 50% or higher. In other words, as the crystal particle is smaller, the transparency is higher, and therefore, this transparency can function as an index for estimating an approximate size of the crystal particle. It is to be noted that, since some components which affect the transparency might be contained depending on compositions of glasses, a relation between a size of the crystal particle and a transparency is slightly different among the glass compositions.

In the preparation process according to the present invention, using a plate-shaped molded glass as a starting glass can provide a plate-shaped crystallized glass. In this case, the glass obtained from the phase separation step is preferably heated up to a temperature for the heat treatment in the crystallization step at a heating rate of 10° C./min or less. The plate-shaped molded glass as a starting glass can be prepared in the usual manner. In addition, using a disk-shaped starting glass as the aforementioned plate-shaped molded glass can provide a disk-shaped crystallized glass plate; or a disk-shaped crystallized glass plate can also be obtained by processing a crystallized glass plate, which is prepared with a starting glass of the plate-shaped molded glass, into a disk-shaped glass. A polishing method described later can be used for processing the glass into a disk-shaped glass.

After finishing the heat treatment for crystallization, the glass is first molded into a desired shape and then the surface of the glass is further polished. The polishing method is not particularly limited, and polishing can be performed by a known polishing method using synthetic grinding grains such as synthetic diamond, silicon carbide, aluminum oxide, boron carbide or the like, or natural grinding grains such as natural diamond, cerium oxide or the like. For example, by conducting lapping process with the usual polishing method and apparatus as well as polishing process using cerium oxide, a surface roughness (Ra (JIS B0601)) of the polished surface can be in the range of from 0.1 to 0.5 nm.

The disk-shaped crystallized glass plate obtained by the preparation process according to the present invention has, for example, a mean particle size of the crystal particle in the range of equal to or less than 100 nm, and this is preferable as a substrate for information recording medium.

In addition, the disk-shaped crystallized glass plate obtained by the preparation process according to the present invention may have, for example, 40% or higher of a transparency at a wavelength of 600 nm, and this is also preferable as a substrate for information recording medium.

Further, the disk-shaped crystallized glass plate obtained by the preparation process according to the present invention may have a polished surface having a surface roughness Ra (JIS B0601) of 1 nm or less, and this is preferable as a substrate for information recording medium.

The crystallized glass, produced by the preparation process according to the present invention, having a polished surface with a surface roughness (Ra (JIS B0601)) in a range from 0.1 to 0.5 nm can satisfy all of surface smoothness, flatness and the like which are required as a magnetic disk substrate. In addition, since the crystallized glass according to the present invention has a higher Young's modulus as approximately twice or more as that of the conventional glass, deflexion due to higher revolution of the disk can be reduced to be smaller, so the glass is preferable as substrate material for realizing a high TPI and high BPI hard disk.

In addition, a magnetic disk can be prepared by forming at least a magnetic layer as a recording layer on the disk-shaped crystallized glass plate obtained by the preparation process according to the present invention. The usual method can be used for forming the magnetic layer on the crystallized glass plate. The present invention comprises a magnetic disk having at least a magnetic layer as a recording layer on the substrate obtained by the preparation process according to the present invention.

[Explanation of Magnetic Disk]

An information recording medium according to the present invention is characterized in comprising a substrate of the present invention and a recording layer formed on the substrate. A magnetic disk (hard disk) comprising a substrate composed of the glass of the present invention and at least a magnetic layer formed on a main surface of the substrate will be explained hereinafter.

As layers other than the magnetic layer, underlying layer, protective layer, lubricating layer, unevenness control layer and the like are optionally formed depending on functions of the disk. The respective layers can be formed by various thin film-forming techniques. Material for the magnetic layer is not particularly limited. For example, in addition to Co based magnetic layers, ferrite based magnetic layers, iron-rare earth metal based magnetic layers and the like can be mentioned. The magnetic layer may be either for horizontal magnetic recording or vertical magnetic recording.

Specific examples of the magnetic thin layer include, for example, those containing Co as a main component such as CoPt, CoCr, CoNi, CoNiCr, CoCrTa and CoPtCr, and CoNiCrPt, CoNiCrTa, CoCrPtTa, CoCrPtSiO and the like. The magnetic layer may be consisted of multiple layers comprising a non-magnetic layer for noise reduction by separating magnetic layers.

The underlying layer of the magnetic layer may be selected depending on the magnetic layer. For example, the underlying layer maybe those comprising at least one or more of non-magnetic metals such as Cr, Mo, Ta, Ti, W, V, B and Al, oxides, nitride, carbides and the like of those metals. For a magnetic layer comprising Co as the main component, an underlying layer of pure Cr or Cr alloy is preferred from the viewpoint of improving magnetic characteristics. The underlying layer is not limited to a monolayer, and may be composed of multiple layers consisting of multiple identical or different layers. For example, the underlying layer may be a multi-layer underlying layer such as Al/Cr/CrMo and Al/Cr/Cr.

The unevenness control layer for preventing absorption of magnetic disk to magnetic head may be provided between the substrate and the magnetic layer or on the magnetic layer. Because surface roughness of the magnetic disk is properly controlled by the unevenness control layer, the magnetic disk is prevented from being absorbed to the magnetic head and hence a highly reliable magnetic disk can be provided. Various materials and production methods for the unevenness control layer have been known and they are not particularly limited. For example, the material of the unevenness control layer may be at least one or more metals selected from Al, Ag, Ti, Nb, Ta, Bi, Si, Zr, Cr, Cu, Au, Sn, Pd, Sb, Ge, Mg and the like, alloys thereof, oxides, nitrides, carbides thereof and the like. For the ease of production, those produced from metals containing Al as a main component such as pure Al, Al alloys, Al oxides and Al nitrides are preferred.

In consideration of head stiction, surface roughness of the unevenness-forming layer is preferably Rmax of 50–300 angstroms, more preferably Rmax of 100–200 angstroms. When the Rmax is less than 50 angstroms, the disk surface is nearly flat, and hence the magnetic head and the disk are absorbed to each other. This is not preferred because the absorption with each other may disadvantageously cause damage of the magnetic head and the magnetic disk, and head crash. On the other hand, when the Rmax exceeds 300 angstroms, glide height becomes larger and recording density is disadvantageously lowered, so this is not preferred.

Unevenness may be provided on the surface of the glass substrate by a texturing treatment such as etching treatment and irradiation of laser lights instead of providing the unevenness control layer.

The protective layer may be, for example, a Cr layer, Cr alloy layer, carbon layer, zirconia layer, silica layer or the like. These protective layers can be successively formed by an inline sputtering apparatus together with the underlying layer, the magnetic layer and the like. These protective layers may have either monolayer structure or multilayer structure comprising identical or different layers.

Another protective layer may be provided on or instead of the protective layer explained above. For example, a silicon oxide ($SiO_2$) layer may be formed on the protective layer mentioned above by applying tetraalkoxysilane diluted in an alcoholic solvent, in which colloidal silica microparticles are further dispersed, and sintering the applied layer. This layer functions as a protective layer and as an unevenness control layer.

While various kinds of layers have been proposed as the lubricating layer, it is generally formed by applying perfluoropolyether, a liquid lubricating agent, diluted in a solvent such as freons by dipping, spin coating, spraying or the like and subjecting the coated layer to a heat treatment as required.

The preparation process according to the present invention provides a crystallized glass capable of providing a magnetic disk substrate composed of the crystallized glass having a polished surface with surface roughness (Ra (JIS B0601)) in the range of from 0.1 to 0.5 nm, the roughness in the range capable of realizing lower head flying. Furthermore, since the magnetic disk composed of the crystallized glass prepared by the preparation process according to the present invention has excellent surface smoothness, lower flying of the magnetic head, that is, higher density recording can be accomplished. In addition, since the magnetic disk composed of the crystallized lass prepared by the preparation process according to the resent invention has higher Young's modulus and higher relative elastic modulus, thinner magnetic disk and higher revolution of the magnetic disk can be accomplished.

EXAMPLES

The present invention will be explained in detail by referring to following examples, but the present invention is not limited to these examples.

Glass compositions of Examples 1 to 25 are shown in Tables 2 to 4 in mol % (or % by weight). It is to be noted that, although the compositions described in Tables 2 to 4 are compositions of the raw materials, the result of analytical comparison between the raw material compositions and the crystallized glass compositions of Examples 1 to 15 showed that the difference of the both compositions was within ±0.1 mol %. Thus, the starting glass compositions shown in Tables 2 to 4 are substantially the same as the crystallized glass compositions.

As the starting materials of these glasses for dissolution, $SiO_2$, $Al_2O_3$, $Al(OH)_3$, MgO, ZnO, NiO, $CaCO_3$, $SrCO_3$, $BaCo_3$, $Y_2O_3$, $TiO_2$, $ZrO_2$, $KNO_3$, $Sr(NO_3)_2$, $Sb_2O_3$ and the like were weighed into 2000 g portions according to the given compositions shown in Tables 2 to 4. It is to be noted that all of these glasses contain $Sb_2O_3$ of 0.03 mol %, although not shown in the Tables. The materials thus weighed were mixed sufficiently to provide formulated batches, and each of them was placed in a platinum crucible and melted in air for 6 hours at 1570° C. while being stirred. After the melting in the crucible, the glass melt was cast into a mold, left to cool to the glass transition temperature, immediately transferred into an annealing furnace, annealed in the glass transition temperature range for about 1 hour and left to cool to room temperature in the furnace. The resulting glasses did not contain deposited crystals which can be observed by a microscope.

The glasses thus obtained were molded into rectangular samples and disks of φ100×1 mm and then further polished. The obtained glasses were placed in a furnace for heat treatment, heated up to a heat treatment temperature, shown in Tables 2 to 4, for phase separation at a heating rate of 3–10° C./min, and kept at the temperature for about 4 hours, thereby being subjected to the heat treatment for phase separation (pretreatment). Immediately after this heat treatment, the glasses were heated up to the heat treatment temperature (second treatment), shown in Tables 2 to 4, for crystallization at a heating rate of 5° C./min, kept at the temperature for about 4 hours, and then cooled down to room temperature in the furnace, thereby crystallized glasses were prepared. The rectangular crystallized glasses thus obtained were further polished into the glasses having a length of 90 mm and used as samples for measurements of Young's modulus and specific gravity. Disc-shaped crystallized glasses of φ100×1 mm were further precisely polished into the disks of φ95×0.8 mm and used as samples for measurement of surface roughness. The measurement of Young's modulus was achieved by the ultrasonic method using samples of 90×10×10 mm. The data obtained in the measurements are shown in Tables 2 to 4, together with the glass compositions.

A mean particle size of the crystal particles in the crystallized glasses of Examples 1 to 4 was measured by using a transmission electron microscope (TEM), and the measured value was 20 to 30 nm. Also, a mean particle size of the crystal particles in the crystallized glass of Example 5 was measured by using a transmission electron microscope (TEM), and the measured value was 50 to 70 nm.

Figure 5:
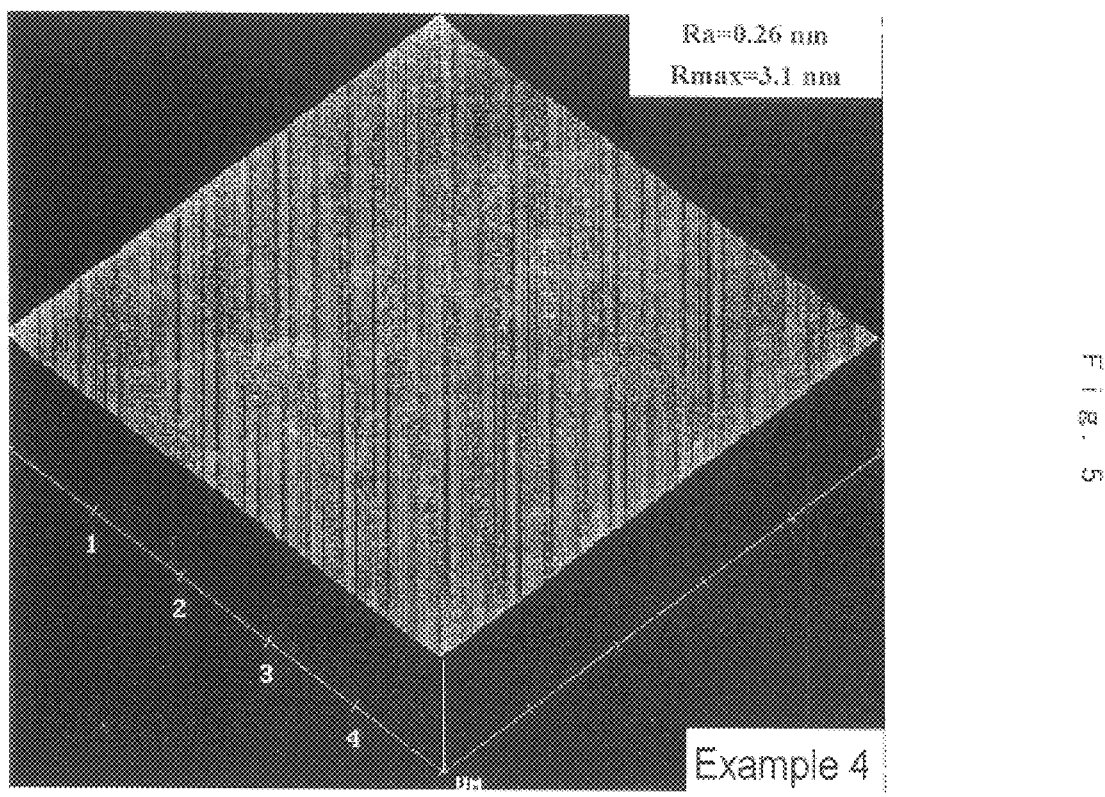
FIG. 5 is an AFM photograph of a surface obtained by polishing a crystallized glass of an Example 4 in a polishing step of an optical glass.

With respect to the measurement for surface roughness, surface was observed using an atomic force microscope (AFM). The arithmetical average roughness in a field of view of 5×5 μm was calculated with respect to 3 to 5 portions on the surface of each sample. FIG. 5 shows an AFM photograph of the crystallized glass of Example 4 which has been polished in a polishing process used for preparation of an optical glass, after subjected to the heat treatment under the conditions for heat treatment shown in Table 2. Example 4 has small surface roughness of about 0.21 nm in Ra (JIS B0601), so this can sufficiently meet the demand for surface smoothness of future magnetic disks.

The crystallized glass of the present invention, in the case of a thickness of 1 mm, had 50% or higher of transparency at a wavelength of 600 nm, and there was provided transparence to some extent. Such the transparence can be an indicator for deciding whether or not desired kinds and particle sizes of crystals are obtained. In the case of the crystallized glass according to the present invention, the aforementioned transparency may be, for example, 20% or higher, further 40% to 90%, or still further 60% to 90%.

TABLE 2

| | Compositions (mol %) | | | | | | | | | |
|---|---|---|---|---|---|---|---|---|---|---|
| | 1 | 2 | 3 | 4 | 5 | 6 | 7 | 8 | 9 | 10 |
| $SiO_2$ | 48.00 | 47.00 | 47.00 | 46.00 | 47.00 | 45.00 | 45.00 | 45.00 | 45.00 | 45.00 |
| $Al_2O_3$ | 11.00 | 10.50 | 10.50 | 10.50 | 12.50 | 10.50 | 10.50 | 10.50 | 10.50 | 10.50 |
| MgO | 30.00 | 30.00 | 28.50 | 31.00 | 28.50 | 30.00 | 30.00 | 30.00 | 30.00 | 30.00 |
| ZnO | | | | | | 2.00 | | | | |
| CaO | | | | | | | 2.00 | | | |
| SrO | | | | | | | | 2.00 | | |
| BaO | | | | | | | | | 2.00 | |
| NiO | | | | | | | | | | 2.00 |
| $Y_2O_3$ | 1.00 | 0.50 | | 0.50 | 2.00 | 0.50 | 0.50 | 0.50 | 0.50 | 0.50 |
| $ZrO_2$ | 0.00 | 2.00 | 2.00 | 2.00 | | 2.00 | 2.00 | 2.00 | 2.00 | 2.00 |
| $TiO_2$ | 10.00 | 10.00 | 10.00 | 10.00 | 10.00 | 10.00 | 10.00 | 10.00 | 10.00 | 10.00 |
| $Al_2O_3$/MgO | 0.37 | 0.35 | 0.37 | 0.34 | 0.44 | 0.35 | 0.35 | 0.35 | 0.35 | 0.35 |
| $SiO_2$/MgO | 1.6 | 1.57 | 1.65 | 1.48 | 1.65 | 1.5 | 1.5 | 1.5 | 1.5 | 1.5 |
| S + A + M | 89 | 87.5 | 86 | 87.5 | 88 | 85.5 | 85.5 | 85.5 | 85.5 | 85.5 |
| Transition temperature Tg (° C.) | 732 | 735 | 729 | 732 | 729 | 715 | 735 | 727 | 719 | 735 |
| Crystal nucleating heat treatment temperature (° C.) | Tg + 28 | Tg + 35 | Tg + 31 | Tg + 38 | Tg + 31 | Tg + 35 | Tg + 25 | Tg + 33 | Tg + 31 | Tg + 35 |
| Crystal nucleating heat treatment time (h) | 4 | 4 | 4 | 4 | 4 | 4 | 4 | 4 | 4 | 4 |
| Heating rate* (° C./h) | 300 | 300 | 300 | 300 | 300 | 300 | 300 | 300 | 300 | 300 |
| Crystallization heat treatment temperature (° C.) | 1000 | 1000 | 1000 | 1000 | 1000 | 1000 | 1000 | 1000 | 1000 | 1000 |
| Crystallization heat treatment time (h) | 4 | 4 | 4 | 4 | 4 | 4 | 4 | 4 | 4 | 4 |
| Heating rate** (° C./h) | 240 | 240 | 240 | 240 | 240 | 180 | 500 | 500 | 500 | 500 |
| Fractured-section kind | Glass | Glass | Glass | Glass | Glass | Glass | Glass | Glass | Glass | Glass |
| Transparency at wavelength of 600 nm | 75% | 73% | 78% | 79% | 76% | 56% | 52% | 60% | 42% | 20% |
| Specific gravity (g/cm³) | 3.086 | 3.14 | 3.11 | 3.158 | 3.038 | 3.25 | 3.21 | 3.29 | 3.34 | 3.24 |
| Young's modulus (GPa) | 148.5 | 150.5 | 147 | 153.2 | 146.7 | 149.2 | 149.5 | 145.3 | 142 | 162 |
| Poisson's ratio | 0.231 | 0.23 | 0.229 | 0.23 | 0.225 | 0.224 | 0.23 | 0.225 | 0.218 | 0.235 |
| Relative modulus of elasticity (MNm/kg) | 48.1 | 47.9 | 47.3 | 48.5 | 48.3 | 45.9 | 46.6 | 44.2 | 42.5 | 50.0 |
| Expansion coefficient ($10^{-7}$/° C.) | 72 | 72 | 75 | 74 | 70 | 72 | 76 | 76 | 68 | 71 |
| Mean particle size (nm) | 30–40 | 20–30 | 20–30 | 20–30 | 50–70 | 30–50 | 30–60 | 30–60 | 40–100 | 30–50 |

S + A + M = $SiO_2$ + $Al_2O_3$ + MgO
*Heating rate at which a temperature rises to a temperature of heat treatment for crystal nucleating
**Heating rate at which a temperature rises from a temperature of heat treatment for crystal nucleating to a temperature of crystallization for crystal nucleating.

TABLE 3

| | Compositions (mol %) | | | | | | |
|---|---|---|---|---|---|---|---|
| | 11 | 12 | 13 | 14 | 15 | 16 | 17 |
| $SiO_2$ | 46.00 | 46.00 | 46.00 | 46.00 | 46.00 | 46.00 | 46.00 |
| $Al_2O_3$ | 10.50 | 10.50 | 10.50 | 10.50 | 10.50 | 10.50 | 10.50 |
| MgO | 30.50 | 30.00 | 30.00 | 31.00 | 30.00 | 31.00 | 31.00 |
| $K_2O$ | 0.5 | | | | 0.5 | | |
| SrO | | 1.00 | 1.50 | 1.00 | 0.50 | | |
| $Y_2O_3$ | 0.50 | 0.50 | | 0.50 | 0.50 | 0.50 | 0.50 |
| $ZrO_2$ | 2.00 | 2.00 | 2.00 | 2.00 | 2.00 | 2.00 | 2.00 |
| $TiO_2$ | 10.00 | 10.00 | 9.00 | 9.00 | 10.00 | 10.00 | 10.00 |
| $Al_2O_3$/MgO | 0.34 | 0.35 | 0.35 | 0.34 | 0.34 | 0.34 | 0.34 |
| S + A + M | 87 | 86.5 | 86.5 | 87.5 | 86.5 | 87.5 | 87.5 |
| Transition temperature Tg (° C.) | 726 | 728 | 726 | 725 | 727 | 732 | 732 |
| Crystal nucleating heat treatment temperature (° C.) | Tg + 30 | Tg + 30 | Tg + 30 | Tg + 30 | Tg + 30 | Tg | Tg − 32 |
| Crystal nucleating heat treatment time (h) | 4 | 4 | 4 | 4 | 4 | 4 | 4 |
| Heating rate* (° C./h) | 300 | 300 | 300 | 300 | 300 | 300 | 300 |
| Crystallization heat treatment temperature (° C.) | 1000 | 1000 | 1000 | 1000 | 1000 | 1000 | 1000 |
| Crystallization heat treatment time (h) | 4 | 4 | 4 | 4 | 4 | 4 | 4 |
| Heating rate** (° C./h) | 240 | 240 | 240 | 240 | 240 | 240 | 240 |
| Fractured-section kind | Glass | Glass | Glass | Glass | Glass | Glass | Glass |
| Transparency at wavelength of 600 nm | 82% | 70% | 67% | 80% | 80% | 80% | 78% |
| Specific gravity (g/cm³) | 3.127 | 3.172 | 3.175 | 3.124 | 3.15 | 3.158 | 3.156 |
| Young's modulus (GPa) | 149.2 | 151.8 | 152.1 | 147.1 | 148.2 | 153.0 | 152.1 |
| Poisson's ratio | 0.232 | 0.234 | 0.234 | 0.231 | 0.232 | 0.231 | 0.232 |
| Relative modulus of elasticity (MNm/kg) | 47.7 | 47.9 | 47.9 | 47.1 | 47.0 | 48.5 | 48.2 |
| Expansion coefficient ($10^{-7}$/° C.) | 77.9 | 75.1 | 74.7 | 79.2 | 78.1 | 74.5 | 72.3 |
| Mean particle size (nm) | 20–30 | 30–50 | 30–50 | 20–30 | 20–30 | 20–30 | 20–30 |

S + A + M = $SiO_2$ + $Al_2O_3$ + MgO
*Heating rate at which a temperature rises to a temperature of heat treatment for crystal nucleating
**Heating rate at which a temperature rises from a temperature of heat treatment for crystal nucleating to a temperature of crystallization for crystal nucleating.

TABLE 4

| | Compositions (mol %) | | | | | | | |
|---|---|---|---|---|---|---|---|---|
| | 18 | 19 | 20 | 21 | 22 | 23 | 24 | 25 |
| $SiO_2$ | 58.00 | 55.00 | 47.00 | 48.00 | 38.00 | 46.00 | 46.00 | 39.00 |
| $Al_2O_3$ | 11.00 | 10.50 | 20.00 | 15.00 | 8.00 | 10.50 | 10.50 | 11.00 |
| MgO | 20.00 | 24.00 | 22.50 | 25.50 | 36.50 | 28.00 | 27.00 | 35.00 |
| $K_2O$ | | | | | | 4.00 | 1.00 | |
| SrO | | | | | | | 3.50 | |
| $Y_2O_3$ | | 0.50 | 0.50 | 0.50 | 5.00 | 0.50 | 0.50 | 1.00 |
| $ZrO_2$ | 1.00 | | | 1.00 | 3.00 | 2.00 | 2.00 | 1.00 |
| $TiO_2$ | 10.00 | 10.00 | 10.00 | 10.00 | 9.50 | 9.00 | 9.50 | 13.00 |
| | 100.00 | 100.00 | 100.00 | 100.00 | 100.00 | 100.00 | 100.00 | 100.00 |
| $Al_2O_3$/MgO | 0.55 | 0.44 | 0.89 | 0.59 | 0.22 | 0.38 | 0.39 | 0.31 |
| $SiO_2$/MgO | 2.9 | 2.29 | 2.09 | 1.88 | 1.04 | 1.64 | 1.70 | 1.11 |
| S + A + M | 89 | 89.5 | 89.5 | 88.5 | 82 | 84.5 | 83.5 | 85 |
| S + A + M + T | 99 | 99.5 | 99.5 | 98.5 | 92 | 93 | 93 | 98 |

TABLE 4-continued

| | Compositions (mol %) | | | | | | | |
|---|---|---|---|---|---|---|---|---|
| | 18 | 19 | 20 | 21 | 22 | 23 | 24 | 25 |
| Transition temperature Tg (° C.) | 740 | 735 | 745 | 740 | 730 | 715 | 735 | 741 |
| Crystal nucleating heat treatment temperature (° C.) | Tg + 30 | Tg + 25 | Tg + 25 | Tg + 30 | Tg + 50 | Tg + 35 | Tg + 25 | Tg + 29 |
| Crystal nucleating heat treatment time (h) | 2 | 2 | 2 | 2 | 2 | 2 | 2 | 2 |
| Heating rate* (° C./h) | 300 | 300 | 300 | 300 | 300 | 300 | 300 | 300 |
| Crystallization heat treatment temperature (° C.) | 1000 | 1000 | 1000 | 1000 | 1000 | 1000 | 1000 | 1000 |
| Crystallization heat treatment time (h) | 4 | 4 | 4 | 4 | 4 | 4 | 4 | 4 |
| Heating rate** (° C./h) | 300 | 300 | 300 | 300 | 300 | 300 | 300 | 300 |
| Fractured section | Glass | Glass | Glass | Glass | Glass | Glass | Glass | Glass |
| Transparency at wavelength of 600 nm | 72% | 76% | 35% | 55% | 30% | 75% | 72% | 62% |
| Specific gravity (g/cc) | 3.12 | 3.14 | 3.05 | 3.08 | 3.41 | 3.012 | 3.124 | 3.39 |
| Young's modulus (GPa) | 145 | 149 | 139 | 142 | 191 | 138 | 146 | 182 |
| Poisson's ratio | 0.221 | 0.22 | 0.231 | 0.232 | 0.241 | 0.223 | 0.221 | 0.242 |
| Relative modulus of elasticity (MNm/kg) | 46.5 | 47.5 | 45.6 | 46.1 | 56.0 | 45.8 | 46.7 | 53.7 |
| Main crystal kind | Enstatite | Enstatite | Enstatite | Enstatite | Enstatite | Enstatite | Enstatite | Enstatite |
| Other crystal | Titanate | Titanate | Titanate | Titanate | Titanate | Titanate | Titanate | Titanate |
| Expansion coefficient ($10^{-7}$/° C.) | 68 | 72 | 62 | 65 | 82 | 72 | 74 | 81 |
| Mean particle size (nm) | 20–30 | 20–30 | 50–70 | 30–50 | 50–80 | 15–30 | 15–30 | 30–60 |
| Ra (JIS B0601) (nm) | 0.3 | 0.3 | 0.5 | 0.4 | 0.4 | 0.2 | 0.2 | 0.4 |

Enstatite: Enstatite and its solid solution
S + A + M = $SiO_2$ + $Al_2O_3$ + MgO
*Heating rate at which a temperature rises to a temperature of heat treatment for crystal nucleating
**Heating rate at which a temperature rises from a temperature of heat treatment for crystal nucleating to a temperature of crystallization for crystal nucleating.

[Method for Producing Hard Disk]

Figure 6:
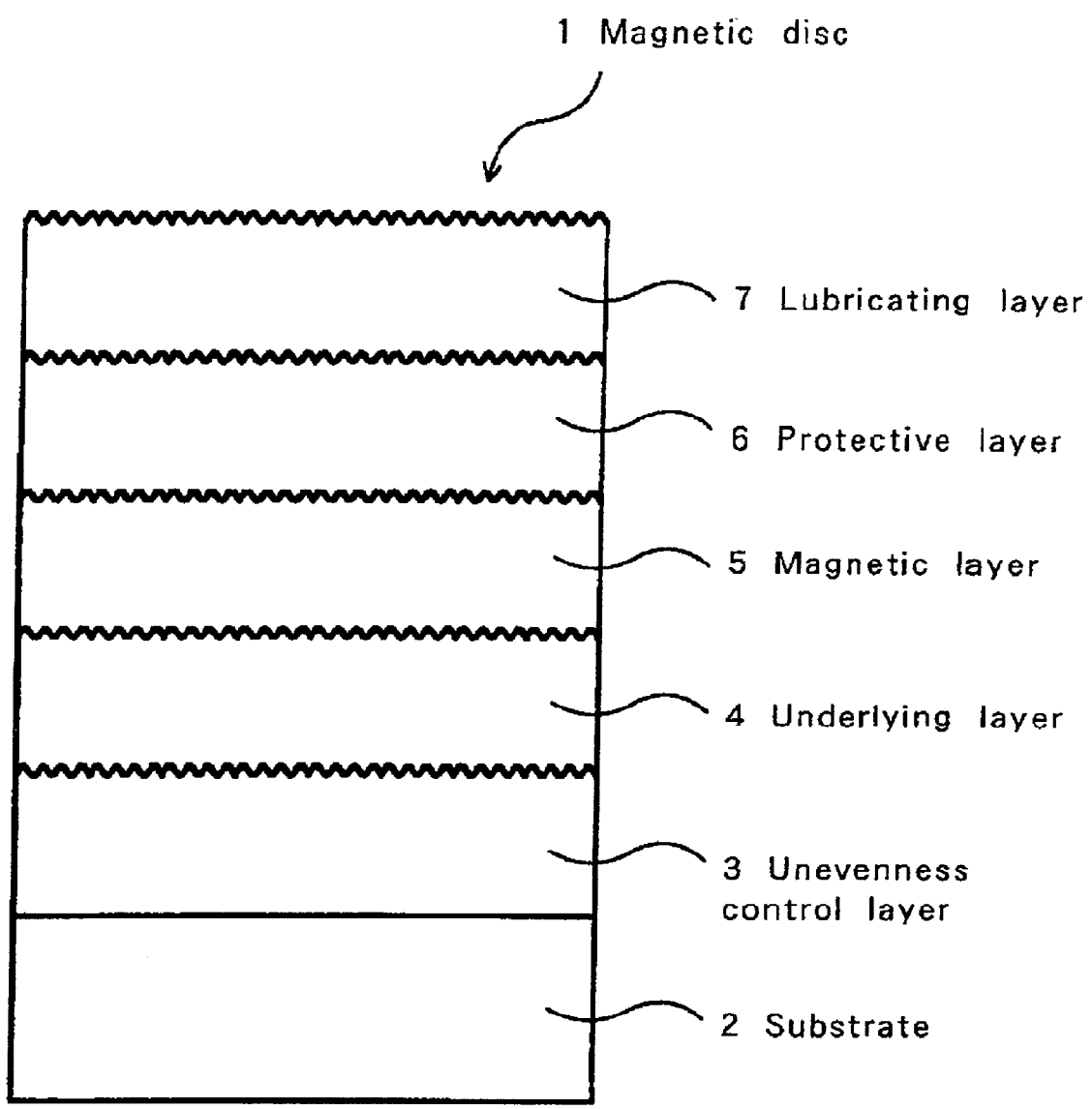
FIG. 6 is a schematic cross-sectional view of a magnetic disk 1 according to the present invention, comprising a crystallized glass substrate 2, on which an unevenness control layer 3, underlying layer 4, magnetic layer 5, protective layer 6 and lubricating layer 7 are provided in this order.

As shown in FIG. 6, a magnetic disk 1 of the present invention comprises a glass substrate 2 made of the crystallized glass of the above Example 1, on which unevenness control layer 3, underlying layer 4, magnetic layer 5, protective layer 6 and lubricating layer 7 are provided in this order.

Each layer will be explained in detail. The substrate 2 was a disk having an outer circular periphery radius of 32.5 mm, inner circular periphery radius of 10.0 mm and thickness of 0.43 mm, whose both main surfaces were subjected to precision polishing so that they should have surface roughness Ra (JIS B0601) of 4 angstroms and Rmax of 40 angstroms.

The unevenness control layer is a thin AlN layer of 5–35% nitrogen content having average roughness of 50 angstroms and surface roughness Rmax of 150 angstroms.

The underlying layer is a thin layer of CrV composed of Cr: 83 at % and V: 17 at % having a thickness of about 600 Å.

The magnetic layer is a thin layer of CoPtCr composed of Co: 76 at %, Pt: 6.6 at %, Cr: 17.4 at % having a thickness of about 300 Å.

The protective layer is a carbon thin layer having a thickness of about 100 angstroms.

The lubricating layer is a layer having a thickness of 8 angstroms, which was formed by applying perfluoropolyether on the carbon protective layer by spin coating method.

The method for producing magnetic disks will be explained hereinafter.

The crystallized glass of Example 1 was cut into a disk having an outer circular periphery radius of 32.5 mm, inner circular periphery radius of 10.0 mm and thickness of 0.5 mm and the both main surfaces were subjected to precision polishing so that they should have surface roughness Ra (JIS B0601) of 4 angstroms and Rmax of 40 angstroms to afford a glass substrate for magnetic recording medium.

Subsequently, the above glass substrate was set on a substrate holder and transferred into a charging chamber of inline sputtering apparatus. Then, the holder on which the crystallized glass substrate was set was transferred to a first chamber where an Al target was etched and sputtering was performed at a pressure of 4 mtorr and substrate temperature of 350° C. in an atmosphere of Ar+$N_2$ gas ($N_2$=4%). As a result, an AlN thin layer having surface roughness Rmax of 150 angstroms and thickness of 50 angstroms (unevenness forming layer) was provided on the crystallized glass substrate.

The holder on which the crystallized glass substrate having the formed AlN layer was set was then transferred into a second chamber provided with a CrV target (Cr: 83 at %, V: 17 at %) and a third chamber provided with a CoPtCr target (Co: 76 at %, Pt: 6.6 at %, Cr: 17.4 at %) successively, and thin layers were formed on the substrate. Sputtering was performed at a pressure of 2 mtorr and substrate temperature of 350° C. in an Ar atmosphere, with the result that a CrV underlying layer having a thickness of about 600 angstroms and a CoPtCr magnetic layer having a thickness of about 300 angstroms were formed.

The multilayer substrate having the formed unevenness control layer, underlying layer and magnetic layer was then transferred to a fourth chamber provided with a heater for heat treatment. The fourth chamber had an inner atmosphere of Ar gas (pressure: 2 mtorr) and the heat treatment was performed by changing the temperature for heat treatment.

The above substrate was then transferred into a fifth chamber provided with a carbon target, and a carbon protective layer having a thickness of about 100 angstroms was formed under the same condition as used for forming of the above CrV underlying layer and the above CoPtCr magnetic layer except that the layer was formed in an atmosphere of Ar+$H_2$ gas ($H_2$=6%).

Finally, the substrate after forming the carbon protective layer was taken out from the above inline sputtering apparatus, and a lubricating layer having a thickness of 8 angstroms was formed by applying perfluoropolyether on the carbon protective layer by the dipping method, thereby affording a magnetic disk.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A process for preparation of a crystallized glass plate in a disk shape comprising a step of phase separation of a starting glass containing $TiO_2$ and a step of crystallization of the resulting phase-separated glass, wherein the phase separation step comprises a heat treatment of the starting glass at a temperature in a range from a temperature 30° C. lower than a glass transition temperature (Tg) of the glass to a temperature 60° C. higher than the glass transition temperature (Tg);

wherein the crystallized glass comprises enstatite and/or its solid solution as a main crystal.

2. The process for preparation according to claim 1, wherein the phase separation step comprises a heat treatment of the starting glass at a temperature in a range from the glass transition temperature (Tg) of the glass to a temperature 60° C. higher than the glass transition temperature (Tg).

3. The process for preparation according to claim 1, wherein the heat treatment is carried out so as to control a mean particle size of the crystal particles contained in the crystallized glass in a range of equal to or less than 100 nm.

4. The process for preparation according to claim 1, wherein the crystallized glass contains $TiO_2$ in an amount equal to or more than 8 mol %.

5. The process for preparation according to claim 1, wherein the crystallized glass is a $SiO_2$—$Al_2O_3$—MgO based glass.

6. The process for preparation according to claim 1, wherein the starting glass containing $TiO_2$ is an MgO—$Al_2O_3$—$SiO_2$ based glass or an MgO—RO—$Al_2O_3$—$SiO_2$ (wherein R is at least one kind selected from a group consisting of alkaline-earth metals (Ba, Ca and Sr), Zn and Ni) based glass, and a total content of MgO, $Al_2O_3$ and $SiO_2$ is equal to or more than 80 mol %.

7. The process for preparation according to claim 1, wherein the starting glass is a plate-shaped molded glass and a crystallized glass in a plate shape is prepared therefrom, and wherein the glass obtained in the phase separation step is heated up to a temperature of the heat treatment in the crystallization step at a heating rate of 10° C./min or less.

8. The process for preparation according to claim 7, wherein the plate-shaped molded glass is in a disk shape, or the plate-shaped molded glass not in a disk shape is processed, after the crystallization step, to be in a disk shape, thus to obtain a crystallized glass plate in a disk shape.

9. A substrate for information recording medium, composed of a disk-shaped crystallized glass plate obtained by the process for preparation according to claim 8, wherein a mean particle size of crystal particles is in a range of equal to or less than 100 nm.

10. A magnetic disk comprising at least a magnetic layer, as a recording layer, formed on the substrate according to claim 9.

11. A substrate for information recording medium, composed of a disk-shaped crystallized glass plate obtained by the process for preparation according to claim 8, wherein a transparency at a wavelength of 600 nm is equal to or more than 40%.

12. A magnetic disk comprising at least a magnetic layer, as a recording layer, formed on the substrate according to claim 11.

13. A substrate for information recording medium, composed of a disk-shaped crystallized glass plate obtained by the process for preparation according to claim 8, wherein a polished surface having a surface roughness Ra (JIS B0601) equal to or less than 1 nm is included.

14. A magnetic disk comprising at least a magnetic layer, as a recording layer, formed on the substrate according to claim 13.

15. A process for preparation of a magnetic disk comprising at least a magnetic layer, as a recording layer, formed on a disk-shaped crystallized glass plate obtained by the process for preparation according to claim 8.

16. A process for preparation of a crystallized glass plate in a disk shape comprising a step of phase separation of a starting glass containing $TiO_2$ and a step of crystallization of the resulting phase-separated glass, wherein the phase separation step comprises a heat treatment of the starting glass at a temperature in a range from a temperature 30° C. lower than a glass transition temperature (Tg) of the glass to a temperature 60° C. higher than the glass transition temperature (Tg);

wherein the crystallized glass comprises enstatite and/or its solid solution in its crystal phase, and the crystallized glass comprises:

| | |
|---|---|
| $SiO_2$: | 35–65 mol % |
| $Al_2O_3$: | 5–25 mol % |
| MgO: | 10–40 mol % |
| $TiO_2$: | 5–15 mol % |
| $Y_2O_3$: | 0–10 mol % |
| $ZrO_2$: | 0–6 mol % |
| $R_2O$: | 0–5 mol %; wherein R is at least one kind selected from the group consisting of Li, Na and K; |

-continued

| | |
|---|---|
| RO: | 0–5 mol %, wherein R is at least one kind selected from the group consisting of Ca, Sr and Ba; |
| $As_2O_3 + Sb_2O_3$: | 0–2 mol %; and |
| $SiO_2 + Al_2O_3 + MgO + TiO_2$: | 92 mol % or more. |

17. A crystallized glass plate in a disk shape prepared by a process comprising a step of phase separation of a starting glass containing $TiO_2$ and a step of crystallization of the resulting phase-separated glass, wherein the phase separation step comprises a heat treatment of the starting glass at a temperature in a range from a temperature 30° C. lower than a glass transition temperature (Tg) of the glass to a temperature 60° C. higher than the glass transition temperature (Tg);

wherein the crystallized glass comprises enstatite and/or its solid solution as a main crystal.

18. The crystallized glass according to claim 17, wherein the phase separation step comprises a heat treatment of the starting glass at a temperature of the glass transition temperature (Tg) of the glass to a temperature 60° C. higher than the glass transition temperature (Tg).

19. The crystallized glass according to claim 17, wherein the heat treatment is carried out so as to control a mean particle size of the crystal particles contained in the crystallized glass in a range of equal to or less than 100 nm.

20. The crystallized glass according to claim 17, wherein the crystallized glass contains $TiO_2$ in an amount equal to or more than 8 mol %.

21. The crystallized glass according to claim 17, wherein the crystallized glass is an $SiO_2$—$Al_2O_3$—MgO based glass.

22. The crystallized glass according to claim 17, wherein the starting glass containing $TiO_2$ is an MgO—$Al_2O_3$—$SiO_2$ based glass or an MgO—RO—$Al_2O_3$—$SiO_2$ (wherein R is at least one kind selected from a group consisting of alkaline-earth metals (Ba, Ca, and Sr), Zn and Ni) based glass, and a total content of MgO, $Al_2O_3$ and $SiO_2$ is equal to or more than 80 mol %.

23. The crystallized glass according to claim 17, wherein the crystallized glass is in a plate shape and in a disk shape.

24. A substrate for information recording medium, composed of the disk-shaped crystallized glass plate according to claim 23, wherein a mean particle size of crystal particles is in a range of equal to or less than 100 nm.

25. A magnetic disk comprising at least a magnetic layer, as a recording layer, formed on the substrate according to claim 24.

26. A substrate for information recording medium, composed of the disk-shaped crystallized glass plate according to claim 23, wherein a transparency at a wavelength of 600 nm is equal to or more than 40%.

27. A magnetic disk comprising at least a magnetic layer, as a recording layer, formed on the substrate according to claim 26.

28. A substrate for information recording medium, composed of the disk-shaped crystallized glass plate according to claim 23, wherein a polished surface having a surface roughness Ra (JIS B0601) equal to or less than 1 nm is included.

29. A magnetic disk comprising at least a magnetic layer, as a recording layer, formed on the substrate according to claim 28.

30. A process for preparation of a magnetic disk comprising at least a magnetic layer, as a recording layer, formed on the disk-shaped crystallized glass plate according to claim 23.

31. A crystallized glass plate in a disk shape prepared by a process comprising a step of phase separation of a starting glass containing $TiO_2$ and a step of crystallization of the resulting phase-separated glass, wherein the phase separation step comprises a heat treatment of the starting glass at a temperature in a range from a temperature 30° C. lower than a glass transition temperature (Tg) of the glass to a temperature 60° C. higher than the glass transition temperature (Tg);

wherein the crystallized glass comprises enstatite and/or its solid solution in its crystal phase, and the crystallized glass comprises:

| | |
|---|---|
| $SiO_2$: | 35–65 mol % |
| $Al_2O_3$: | 5–25 mol % |
| MgO: | 10–40 mol % |
| $TiO_2$: | 5–15 mol % |
| $Y_2O_3$: | 0–10 mol % |
| $ZrO_2$: | 0–6 mol % |
| $R_2O$: | 0–5 mol %, wherein R is at least one kind selected from the group consisting of Li, Na and K; |
| RO: | 0–5 mol %, wherein R is at least one kind selected from the group consisting of Ca, Sr and Ba; |
| $As_2O_3 + Sb_2O_3$: | 0–2 mol %; and |
| $SiO_2 + Al_2O_3 + MgO + TiO_2$: | 92 mol % or more. |

* * * * *